United States Patent
Agashe et al.

(10) Patent No.: US 9,817,163 B2
(45) Date of Patent: Nov. 14, 2017

(54) VENTED TOOLING BELT FOR PRODUCTION OF STRUCTURED SURFACES

(71) Applicant: Avery Dennison Corporation, Glendale, CA (US)

(72) Inventors: Nikhil R. Agashe, Naperville, IL (US); John D. Peck, Arlington Heights, IL (US); Ethelbert Galicia, Lincolwood, IL (US); Steven R. Chapman, Glenview, IL (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 15/099,679

(22) Filed: Apr. 15, 2016

(65) Prior Publication Data

US 2016/0306082 A1    Oct. 20, 2016

Related U.S. Application Data

(60) Provisional application No. 62/147,681, filed on Apr. 15, 2015.

(51) Int. Cl.
| | |
|---|---|
| *G02B 5/124* | (2006.01) |
| *B29D 11/00* | (2006.01) |
| *B29C 37/00* | (2006.01) |
| *B29C 59/04* | (2006.01) |
| *B29C 59/00* | (2006.01) |
| B29C 59/02 | (2006.01) |

(52) U.S. Cl.
CPC ............ *G02B 5/124* (2013.01); *B29C 37/006* (2013.01); *B29C 59/002* (2013.01); *B29C 59/04* (2013.01); *B29D 11/00605* (2013.01); *B29D 11/00625* (2013.01); B29C 59/022 (2013.01)

(58) Field of Classification Search
CPC .............. G02B 5/124; B29D 11/00605; B29D 11/00625; B29C 37/006; B29C 59/002; B29C 59/04; B29C 59/022
USPC .......................................... 359/529–552, 900
See application file for complete search history.

(56) References Cited

U.S. PATENT DOCUMENTS

| | | |
|---|---|---|
| 3,684,348 A | 8/1972 | Rowland |
| 4,025,159 A | 5/1977 | McGrath |
| 4,066,236 A | 1/1978 | Lindner |
| 4,478,769 A | 10/1984 | Pricone et al. |
| 4,576,850 A | 3/1986 | Martens |
| 5,117,304 A | 5/1992 | Huang et al. |
| 5,156,863 A | 10/1992 | Pricone et al. |

(Continued)

FOREIGN PATENT DOCUMENTS

WO    1995/11464    4/1995

OTHER PUBLICATIONS

International Search Report and Written Opinion dated Jul. 5. 2016 issued in corresponding international Application No. PCT/US2016/027663 filed Apr. 15, 2016.

*Primary Examiner* — James Phan
(74) *Attorney, Agent, or Firm* — Avery Dennison Corporation

(57) ABSTRACT

Various geometries are described for forming retroreflective structures in polymeric sheets or films. The geometries enable venting of volatile gases that can otherwise become trapped between the embossing surface and the polymeric sheet or film. The geometries are incorporated in tooling belts or other pattern forming surfaces.

37 Claims, 3 Drawing Sheets

(56) References Cited

U.S. PATENT DOCUMENTS

| | | |
|---|---|---|
| 5,512,219 A | 4/1996 | Rowland et al. |
| 6,159,407 A | 12/2000 | Krinke et al. |
| 6,322,652 B1 | 11/2001 | Paulson et al. |
| 2003/0224144 A1 | 12/2003 | King et al. |
| 2004/0174602 A1* | 9/2004 | Smith .............. B29D 11/00605 359/530 |
| 2006/0057367 A1 | 3/2006 | Sherman et al. |
| 2008/0012162 A1 | 1/2008 | Chapman et al. |
| 2010/0053754 A1 | 3/2010 | Chapman et al. |

* cited by examiner

VENTED TOOLING BELT FOR PRODUCTION OF STRUCTURED SURFACES

CROSS-REFERENCE TO RELATED APPLICATION

The present application claims the benefit of U.S. Provisional Patent Application No. 62/147,681 filed Apr. 15, 2015, which is incorporated herein by reference in its entirety.

FIELD

The present subject matter relates to retroreflective materials and more particularly to the production of retroreflective sheeting or film. The present subject matter also relates to tooling for forming retroreflective sheeting or film.

BACKGROUND

Materials that include retroreflective structures such as microcubes or glass beads typically possess a property such that incident light is reflected back in a direction from which the light originates. This makes the materials popular for use in a wide range of products that require a retroreflective attribute. The materials are particularly useful for safety applications, including signage, construction barriers, traffic barriers, personal protection gear and the like.

Several methods are known to make materials retroreflective. One method uses microscopic beads to form what is generally referred to as "beaded sheets." The microscopic beads may include a metallized coating to improve performance, i.e., optical reflectance. The microscopic beads may be deposited on a surface of sheeting or film, or be partially or fully embedded in the sheeting. A second method uses microprisms, commonly referred to as "prismatic sheeting." Prismatic sheeting uses microstructures such as cube-cornered, triangles, hexagons, squares and/or rectangles incorporated or otherwise formed on sheeting or film to return back reflected light.

During manufacturing of prismatic films, a potential exists for trapping volatile gases between a polymer film and a metallic tooling belt which is typically used to form a pattern in the film. The volatile gases are typically emitted during the softening and melting of the polymer films. If these gases are trapped between the tooling and the polymer film, they may lead to visual defects such as bubbles or voids and affect the quality of the resulting prismatic film.

Accordingly, a need exists for a strategy of reducing the potential for, and ideally eliminating or substantially so, trapped volatile gases along the prismatic film during its formation.

SUMMARY

The difficulties and drawbacks associated with previous approaches are addressed in the present subject matter as follows.

In one aspect, the present subject matter provides a method for reducing occurrence of gases trapped between tooling and a polymeric sheet during manufacture of retroreflective materials. The method comprises providing a substrate defining opposite peripheral edges and a molding surface extending between the edges. The molding surface includes a plurality of prismatic structures. The plurality of prismatic structures define an average structure height. The molding surface includes a plurality of channels extending across at least a portion of the molding surface. The channels define an average depth of from 5% to 50% of the average structure height. The method also comprises providing a polymeric sheet defining at least one face. The method additionally comprises embossing a pattern of the plurality of prismatic structures from the substrate to the face of the polymeric sheet. During the embossing, gases disposed between the substrate and the polymeric sheet are urged through at least a portion of the channels, thereby reducing occurrence of trapped gases.

In another aspect, the present subject matter provides various retroreflective materials and articles produced by the previously noted method.

In another aspect, the present subject matter provides tooling for forming a pattern of microstructures. The tooling comprises a substrate defining opposite peripheral edges and a molding surface extending between the edges. The molding surface includes a plurality of prismatic structures. The plurality of prismatic structures defines an average structure height. The molding surface includes a plurality of channels extending across at least a portion of the molding surface. The channels define an average depth of from 5% to 50% of the average structure height.

In still another aspect, the present subject matter provides a method for reducing occurrence of gases trapped between tooling and a polymeric sheet during manufacture of retroreflective materials. The method comprises providing a substrate defining opposite peripheral edges and a molding surface extending between the edges. The molding surface includes a plurality of prismatic structures defined by baselines. The plurality of prismatic structures defines an average structure height. The molding surface includes a plurality of passages, each passage located so as to extend across a baseline. The passages have an average depth of from 5% to 50% of the average structure height. The method also comprises providing a polymeric sheet defining at least one face. The method additionally comprises embossing a pattern of the plurality of prismatic structures from the substrate to the face of the polymeric sheet. During the embossing, gases disposed between the substrate and the polymeric sheet are urged through at least a portion of the passages, thereby reducing occurrence of trapped gases.

In another aspect, the present subject matter provides various retroreflective materials and articles produced by the previously noted method.

In yet another aspect, the present subject matter provides tooling for forming a pattern of microstructures. The tooling comprises a substrate defining opposite peripheral edges and a molding surface extending between the edges. The molding surface includes a plurality of prismatic structures defined by baselines. The plurality of prismatic structures define an average structure height. The molding surface includes a plurality of passages, each passage located so as to extend across a baseline. The passages have an average depth of from 5% to 50% of the average structure height.

In still another aspect, the present subject matter provides retroreflective materials comprising a polymeric substrate including a plurality of prismatic structures. The plurality of prismatic structures define a structured surface having a first set of structures with an average structure height, and a second set of structures having a height of from 5% to 50% of the height of the first set of structures. The prismatic structures include triangles arranged so as to define a plurality of baselines separating each triangle from an adjacent triangle.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides vented tooling belts (or "tooling") which include unbounded ordered prismatic structures on a microscale, and in certain embodiments such structures on a nanoscale. The present subject matter also provides methods of forming retroreflective sheeting or other products that include such prismatic structures using the noted vented tooling belts. And, the present subject matter additionally provides retroreflective sheeting and products that are formed by the various methods which utilize the vented tooling belts.

A tooling belt used for forming films having retroreflective structures typically has millions of bounded prismatic structures. Such tooling belts, as commonly referred to, are used to replicate or form these structures on to a polymer film to create prismatic or retroreflective films, among other applications. During the manufacture of the prismatic films, volatile gases, or "volatiles" frequently outgas from the polymer films. These volatiles can become trapped in the bounded cavities of the prismatic structures leading to poor quality of the resulting prismatic film.

In various embodiments of the present subject matter, adjacent or adjoining prismatic structures are linked to neighboring prismatic structures by forming particular channels or passages, thereby enabling the transfer of volatile gases which are typically emitting during the replication process. The direction of travel of the volatile gases within the channels or passages during production of a prismatic film is, in many applications, generally opposite a direction of belt travel. Thus, the gases are urged or directed out of interfacial cavities as the polymer film melts and fills or partially fills such cavities. In certain applications, this may also enable manufacturing of embossed films at higher speeds. These and other aspects of the present subject matter are all described in greater detail herein.

Figure 1:
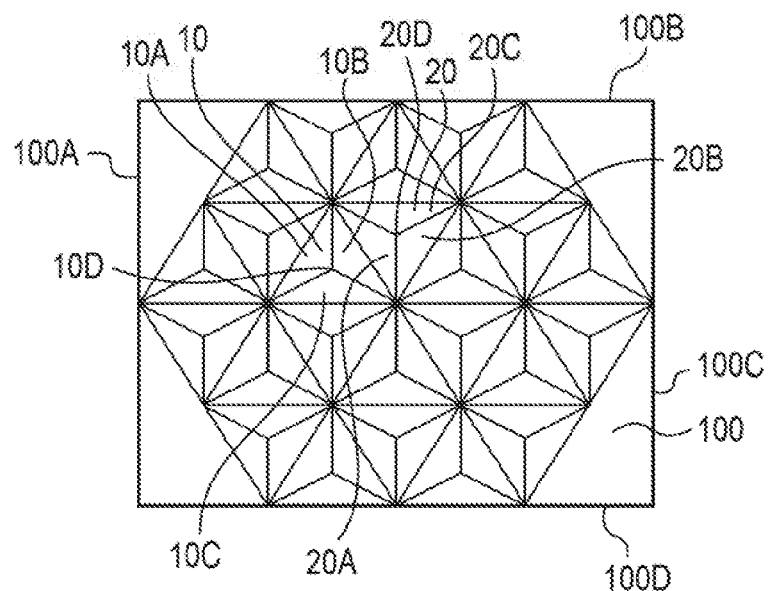
FIG. 1 is a schematic illustration of a conventional triangular prismatic structured surface on a tooling belt.

In certain embodiments and in accordance with the present subject matter, one or more linking channels can be formed in several different ways, and various configurations are described herein. Many of these configurations are based upon a triangular prismatic structured surface as depicted in FIG. 1. Specifically, FIG. 1 is a planar view of a conventional triangular prismatic structured surface provided on a tooling belt 100. The prismatic structured surface includes a plurality of triangles such as triangles 10 and 20 for example. Triangle 10 includes sides 10A, 10B, and 10C. The sides 10A, 10B, and 10C converge at a tip 10D. Similarly, triangle 20 includes sides 20A, 20B, and 20C which converge at a tip 20D. The structured surface including the plurality of triangles is oriented such that the tips 10D, 20D, and 25D extend into the sheet or page of FIG. 1. Thus, the tips 10D, 20D, and 25D for example are depressions in the tooling belt 100. It will be appreciated that the structured surface can extend entirely across a face of the tooling belt 100, such as to edge regions or sides 100A, 100B, 100C, and/or 100D. However, it will be appreciated that the present subject matter includes embodiments in which a structured surface does not extend entirely or completely to one or more sides or edge regions of a tooling belt.

Figure 2:
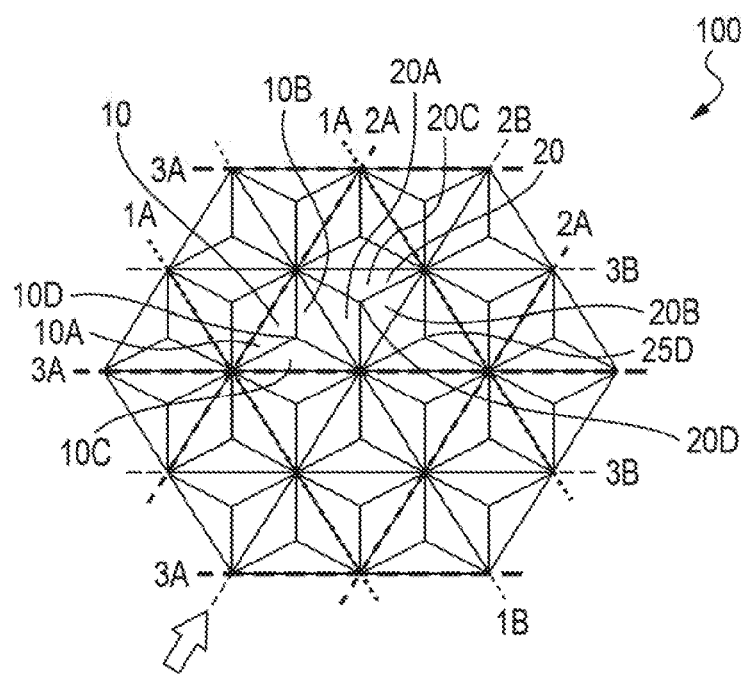
FIG. 2 is a schematic illustration of an operation performed upon a triangular prismatic structured surface of a tooling belt in accordance with the present subject matter.
Figure 3:
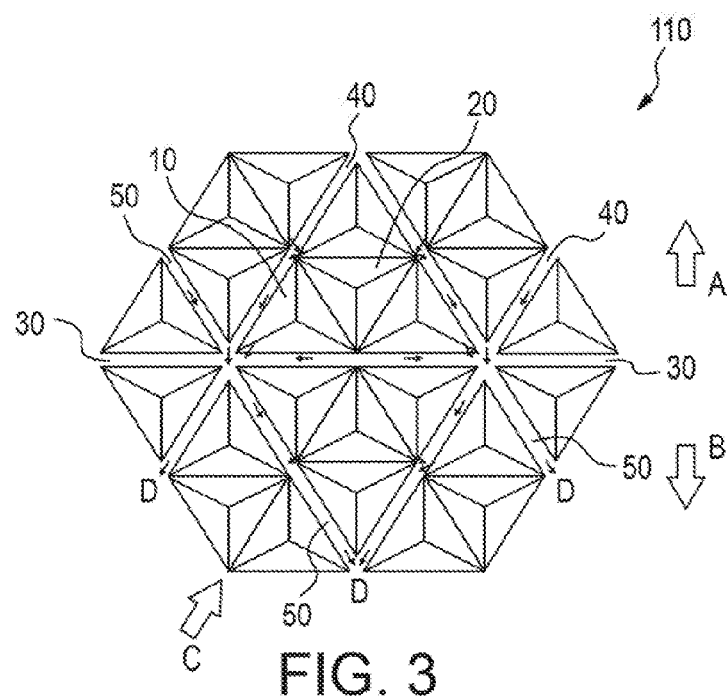
FIG. 3 is a schematic illustration of an embodiment of a vented tooling belt in accordance with the present subject matter.

In one embodiment of the present subject matter, depicted FIGS. 2 and 3, a plurality of linking channels are provided in the structured surface. The linking channels can be in the form of grooves. The grooves can be made by a V shaped blade provided by a diamond tool for example. These grooves extend along the boundaries of the prismatic structures and are formed along alternate baselines that define the prismatic structures. Specifically, FIG. 2 illustrates the structured surface previously described in conjunction with FIG. 1. Another tip 25D is shown. Triangle 10 is defined by baselines 1B, 2A, and 3A. Triangle 20, adjacent to triangle 10, is defined by baselines 1B, 2B, and 3B. The linking channels of the present subject matter extend along alternate baselines such as along baselines 1A, 2A, and/or 3A. In particular embodiments, the channels extend along all alternate baselines such as 1A, 2A, and 3A. In certain embodiments, the channels do not extend along the remaining baselines such as 1B, 2B, and 3B. Thus, in those embodiments, baselines 1B, 2B, and 3B are free of linking channels. In many embodiments, the channels extend along one or more pairings of baselines with one or more baselines disposed therebetween which are free of such channels. Thus, referring to FIG. 2 for example, the channels extend along a pair of baselines 1A with baseline 1B free of any channel(s); a pair of baselines 2A with baseline 2B free of any channel(s); and/or a pair of baselines 3A with baseline 3B free of any channel(s). Typically, corresponding baselines in a structured surface are parallel with one another. For example, each of baselines 3A are parallel with each other and also parallel with baselines 3B. Each of baselines 2A are parallel with each other and also with baselines 2B. And baselines 1A are parallel with each other and also with baselines 1B.

FIG. 3 illustrates the structured surface of FIG. 2 after a plurality of grooves or linking channels 30, 40, and 50 have been formed in the structured surface in accordance with the present subject matter. The tooling belt 100 after such modifications is designated as tooling belt 110. It will be appreciated that grooves 30 are formed along baselines 3A, grooves 40 are formed along baselines 2A, and grooves 50 are formed along baselines 1A. Formation or incorporation of the grooves 30, 40, and 50 in the structured surface results in a difference in heights of the prismatic structures as seen in side or elevational view.

Figure 4A:
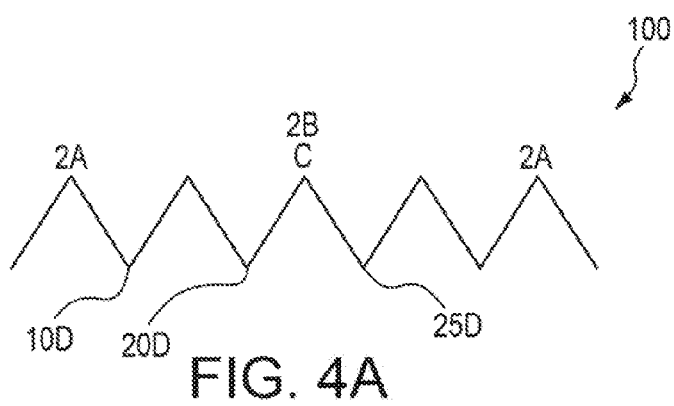
FIG. 4A is a schematic side view of the structured surface as viewed in the direction of arrow C in FIG. 2 prior to the noted operation.
Figure 4B:
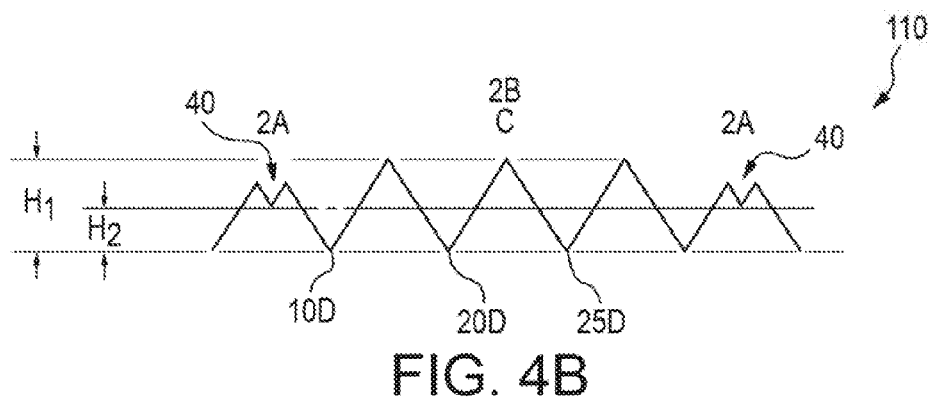
FIG. 4B is a schematic side view of the vented tooling belt of FIG. 3 as viewed in the direction of arrow C in FIG. 3.

FIGS. 4A and 4B schematically illustrate a side view of a section of the tooling belt 100, 110 as viewed in the direction of arrow C in FIGS. 2 and 3. FIG. 4A illustrates a side view of the triangular prismatic structured surface depicted in FIG. 2 and prior to formation or incorporation of any channels. And, FIG. 4B illustrates the same structured surface after formation of a pair of channels 40 that extend along a pair of baselines 2A, such as depicted in FIG. 3. It will be appreciated that the baselines 2A are separated by a parallel baseline 2B disposed between the baselines 2A. Formation or incorporation of the channels 40 create differences in heights of structures of the structured surface. Specifically, referring to FIG. 4B, the height from a lowermost surface or region of the structured surface such as tips 10D, 20D, and 25D; to an apex such as baselines 2A, 2B (and/or any of the other baselines 1A, 1B, 3A, and 3C) is shown as height $H_1$. After forming the channels or grooves 30, 40, and 50, the height from a lowermost region of a channel or groove to an apex is shown as height $H_2$. The depth of the channels such as channels 30, 40, and 50 is typically from about 5% to about 50% of the height of the structures, i.e., $H_1$. In certain embodiments, the depth of the channels is from about 10% to about 15% of the structure height. It will be appreciated that the present subject matter includes other heights and is not limited to any of these particular heights or ranges of heights. This difference in height, e.g., $H_1$-$H_2$, creates linking channels serving as a path for dissipation of volatile gases during an embossing process described in greater detail herein. The path or direction of flow of the gas during the embossing process is shown by the arrows D in FIG. 3. Thus referring to FIG. 3, during an embossing process to form retroreflective sheeting or other articles, movement of the tooling belt in the direction of arrow A results in displacement of gas in the general direction of arrow B, and through the structured surface in the channels as shown by arrow D. The grooves 30, 40, and 50 do not cause a significant reduction in retroreflectivity, if any.

The present subject matter includes forming linking channels in a variety of different patterns and arrangements of prismatic structures in tooling, and the resulting tooling. For example, in certain embodiments the prismatic structures are triangles arranged so as to define a plurality of baselines separating each triangle from an adjacent triangle. In particular embodiments, the plurality of baselines include a first set of baselines oriented parallel to one another, a second set of baselines oriented parallel to one another and at 60 degrees from the first set of baselines, and a third set of baselines oriented parallel to one another and at 60 degrees from the second set of baselines and at 60 degrees from the first set of baselines for uncanted triangular cube corners. For canted cube corners, the angle can vary from 60 degrees. In certain embodiments, the plurality of linking channels include at least one channel extending along at least one of the first set of baselines, at least one channel extending along at least one of the second set of baselines, and at least one channel extending along at least one of the third set of baselines. In specific versions, the plurality of channels which extend along at least one of the first set of baselines includes two channels separated by another of the first baselines. In still additional versions, the plurality of channels which extend along at least one of the second set of baselines includes two channels separated by another of the second baselines. And in yet other versions, the plurality of channels which extend along at least one of the third set of baselines includes two channels separated by another of the third baselines.

Figure 5:
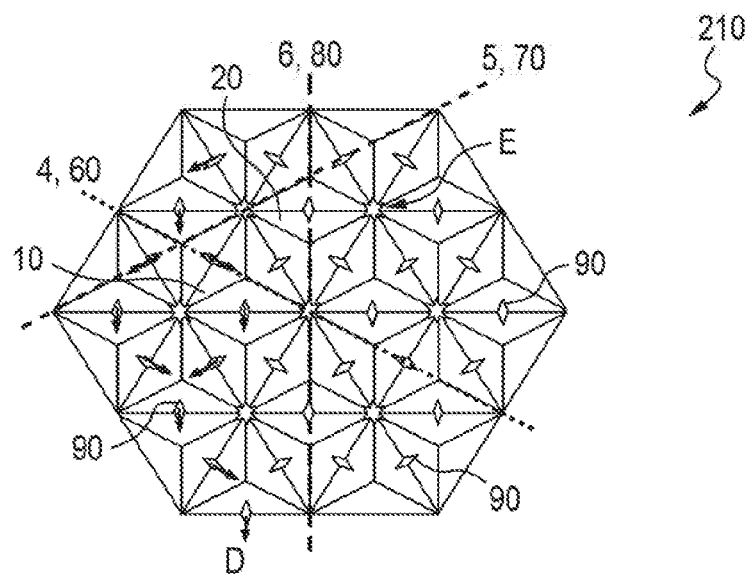
FIG. 5 is a schematic illustration of another embodiment of a vented tooling belt in accordance with the present subject matter.

In another embodiment, a triangular prismatic structured surface on tooling is modified by forming linking passages in various directions as shown in FIG. 5. The passages, in this form, are made with a diamond tool for example and are located at the center of a perpendicular to the baseline of the prism. This results in shallow V cuts about 5% to about 50% and particularly about 10 to 15% of the height of the prismatic structures. Specifically, in this embodiment, a first set of cuts 60 are formed along a first set of lines 4, a second set of cuts 70 are formed along a second set of lines 5, and a third set of cuts 80 are formed along a third set of lines 6. In FIG. 5, lines 4, 5, and 6 are not baselines. In FIG. 5, the cuts are not along baselines (as in FIGS. 2 and 3), but rather extend perpendicular to the baselines. The cuts may not be exactly centered. As a result of cuts 60, 70, and 80 extending through raised regions of the structured surface, a plurality of passages 90 are formed. Upon formation of the noted passages, a modified tooling belt 210 results. Each passage 90 can be located at the center of, extends across, and is generally perpendicular to, the baseline of a structure such as triangles 10, 20. The passages 90 can be formed in a variety of ways such as by cutting depressions along the face of the tooling belt which results in shallow V-shaped cuts about 5% to about 50% and particularly about 10% to 15% of the height of the prismatic structures.

Figure 6:
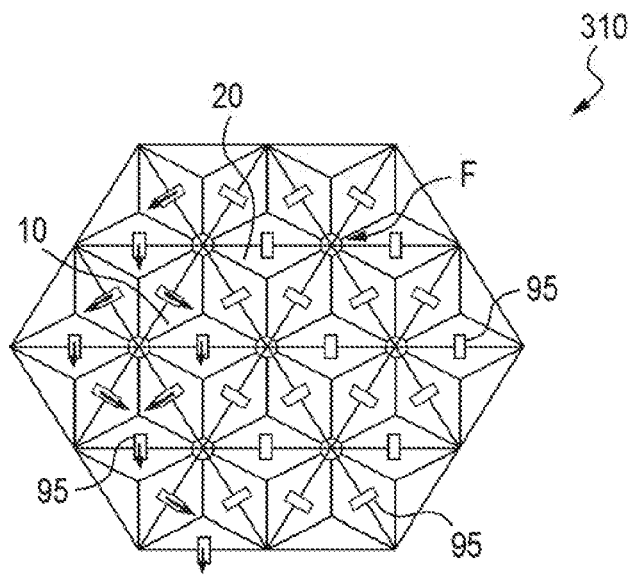
FIG. 6 is a schematic illustration of another embodiment of a vented tooling belt in accordance with the present subject matter.

Yet another embodiment tooling belt 310 is shown in FIG. 6, having a plurality of passages 95. Specifically, the tooling belt 310 includes a plurality of passages 95 formed on the face of the structured surface. Each passage 95 can be located at the center of, extends across, and is generally perpendicular to, the baseline of a structure such as triangles 10, 20. The passages 95 can be formed in a variety of ways such as by cutting depressions along the face of the tooling belt which results in shallow U-shaped cuts about 5% to about 50% and particularly about 10% to 15% of the height of the prismatic structures. These cuts or channels open up the bounded prismatic structures such that each prismatic structure has an opening with adjoining prism cavities. This continuous network of openings enables the travel of gas as shown in FIGS. 5 and 6 by the arrows D.

In certain embodiments, an additional benefit of forming the noted linking channels and/or passages is an increase in daytime brightness in retroreflective sheeting or products formed from tooling with the modified structured surface(s). The increase in daytime brightness results from an increase in scattering of light due to the structure of the channels. The regions of increased surface area are located at intersecting locations within a structured surface, shown by arrows E and F in FIGS. 5 and 6. These locations correspond to a point of intersection for the three cutting grooves, and will form a scattering spot with an increase in surface area as compared to a conventional configuration as shown in FIG. 1. With a metalized sheeting, the cuts can be designed in a specific manner to achieve a further increase in daytime brightness.

In accordance with the present subject matter, the various linking channels, passages and/or throughways for directing volatiles out of the structured surfaces during formation of retroreflective materials, products and articles, can be formed using a variety of technologies. As previously described, the channels and/or passages are formed in the structured surface provided on tooling such as a tooling belt. Cutting operations can be used to form such channels and/or passages and may utilize diamond tipped cutting tools. Cross sectional shapes of the channels and/or passages can include V-shapes, U-shapes, arcuate shapes, oval shapes, and other shapes. The channels and/or passages can be formed by laser water jet cutting as known in the art, laser inducted plasma forming or shaping as known, and sinker electro discharge machining (EDM).

As previously described, use of the present subject matter vented tooling reduces the potential for trapping of volatile outgases. The present subject matter can be varied to maximize or at least increase the outgas removal and thus lead to increased line speeds in an embossing process.

The tooling as described herein can be obtained by first manufacturing a master mold that has a structured surface. Methods of manufacturing master molds are known in the art. Master molds employed for making retroreflective sheeting are typically prepared from pin-bundling techniques, direct machining techniques, and techniques that employ laminae, as described in the art. The master mold is then replicated using any suitable technique such as conventional nickel electroforming to produce a tool of a desired size for forming cube corner retroreflective sheeting. Electroforming techniques such as described in U.S. Pat. Nos. 4,478,769 and 5,156,863 to Pricone as well as U.S. Pat. No. 6,159,407 to Krinke are known. A plurality of replications are often joined together for example by welding such as described in U.S. Pat. No. 6,322,652 to Paulson.

The methods and tooling of the present subject matter are suitable for use with any microstructure design, e.g. cube corner element design. For retroreflective sheeting, the tooling has a molding surface having a plurality of microstructures, e.g. cube corner elements that are typically in the form of depressions or cavities. The opening at the top surface of a cavity corresponds to the base of a resultant cube corner element.

The microstructured tooling can be made from polymeric, metallic, composite, or ceramic materials. A polymeric resin is used to replicate the microstructure and is allowed to harden, i.e., solidify, while in contact with the tool. For embodiments wherein solidification of the resin will be performed by applying radiation through the tooling, the tooling should be sufficiently transparent to permit irradiation through the resin. It is also contemplated that a transparent carrier film could be used. Illustrative examples of materials from which tooling for such embodiments can be made include polyolefins and polycarbonates. Metal tooling such as metal tooling belts are particularly useful for the extrusion of molten thermoplastic resin as they can be formed in desired shapes and provide excellent optical surfaces to maximize retroreflective performance of a given cube corner element configuration. Thermoplastic resins are typically solidified via cooling. In many embodiments, the tooling is comprised of a suitable material, e.g., nickel, to ensure that the cavities will not deform during fabrication of the composite article diminishing the retroreflected brightness of the sheeting, and such that the array of cube corner elements can be separated therefrom after curing. Depending upon the tooling used and the nature of the resin composition, the cured array may separate from the tooling readily or a parting layer may be necessary to achieve desired separation characteristics. Illustrative examples of parting layer materials include an induced surface oxidation layer, an intermediate thin metallic coating, chemical silvering, and combinations of different materials or coatings. If desired, suitable agents may be incorporated into the resin composition to achieve desired separation characteristics.

Suitable resin compositions for the retroreflective sheeting of the present subject matter include transparent materials that are dimensionally stable, durable, weatherable, and readily formable into the desired configuration. Examples of suitable materials include acrylics, which have an index of refraction of about 1.5, such as PLEXIGLAS brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. Polycarbonates are particularly suitable because of their toughness and relatively high refractive index, which generally contributes to improved retroreflective performance over a wider range of entrance angles. Injection molding grade polycarbonate having a melt flow rate ranging from 17 g/10 minutes to 24 g/10 minutes (ASTM D1238 or ISO 1133-1991; condition 300/1.2) are useful for many applications. These materials may also include dyes, colorants, pigments, UV stabilizers, or other additives. Although transparent synthetic resins are employed in the manufacture of retroreflective sheeting, in the case of other microstructured articles, the synthetic resin may be opaque or translucent as well.

In the case of molten polymeric resins, the resin typically solidifies as a function of sufficient cooling. For example, polycarbonate sufficiently cools upon reaching a temperature of about 240° F. or lower. Cooling can be achieved by any means including by spraying water onto the extruded resin or tool, contacting the unstructured surface of the resin or tool with cooling rolls, or by means of direct impingement air jets provided by high pressure blowers.

Other illustrative examples of materials suitable for forming the array of cube corner elements are reactive resin systems capable of being crosslinked by a free radical polymerization mechanism by exposure to actinic radiation, for example, electron beam, ultraviolet light, or visible light. Additionally, these materials may be polymerized by thermal means with the addition of a thermal initiator such as benzoyl peroxide. Radiation-initiated cationically polymerizable resins also may be used. Reactive resins suitable for forming the array of cube corner elements may be blends of photoinitiator and at least one compound bearing an acrylate group. In many embodiments, the resin blend contains a monofunctional, a difunctional, or a polyfunctional compound to ensure formation of a cross-linked polymeric network upon irradiation.

Illustrative examples of resins that are capable of being polymerized by a free radical mechanism that can be used herein include acrylic-based resins derived from epoxies, polyesters, polyethers, and urethanes, ethylenically unsaturated compounds, isocyanate derivatives having at least one pendant acrylate group, epoxy resins other than acrylated epoxies, and mixtures and combinations thereof. The term "acrylate" is used here to encompass both acrylates and methacrylates. U.S. Pat. No. 4,576,850 to Martens discloses examples of crosslinked resins that may be used in cube corner element arrays of the present subject matter.

The manufacture of the sheeting may include other optional manufacturing steps prior to or subsequent to solidification of the sheeting. For example, the retroreflective sheeting can be manufactured as a layered product by casting the cube-corner elements against a preformed film as described in PCT application No. WO 95/11464 and U.S. Pat. No. 3,684,348, or by laminating a preformed film to preformed cube-corner elements. In doing so the individual cube-corner elements are interconnected by the preformed film. Further, the elements and film are typically comprised of different materials.

Alternatively or in addition thereto, specular reflective coating such as a metallic coating can be placed on the backside of the cube-corner elements. The metallic coating can be applied by known techniques such as vapor depositing or chemically depositing a metal such as aluminum, silver, or nickel. A primer layer may be applied to the backside of the cube-corner elements to promote the adherence of the metallic coating.

In addition to or in lieu of a metallic coating, a seal film can be applied to the backside of the cube-corner elements; see, for example, U.S. Pat. Nos. 4,025,159 and 5,117,304. The seal film maintains an air interface at the backside of the cubes that enables total internal reflection at the interface and inhibits the entry of contaminants such as soil and/or moisture.

The term "embossing" as used herein refers to a process in which a pattern is impressed into the surface of an article. Embossing typically is accomplished by means of a male or female pattern formed on a hard material such as a metal layer on an embossing roll. Those skilled in the art will recognize that embossing can be done by several methods, including the use of a continuous tooled belt or sleeve. In many embodiments metal layers include those comprising nickel, copper, steel, and stainless steel. Patterns typically are machined into the metal layer and can have a wide variety of sizes and shapes. Any pattern that can be scribed into a metal surface can be used in the practice of the present subject matter. "Pattern" does not necessarily refer to a regular repeating array, but may mean a random array of features having the same or different sizes. Patterns suitable for the practice of the present subject matter include four-sided square pyramids, truncated four-sided square pyramids, three-sided triangular pyramids, cones, straight lines, wavy lines, and the like and are machined into at least a portion of the embossing roll. An individual feature of the pattern is referred to as an embossment. The number and spacing of embossments, as well as the nature of the individual embossment, such as its depth, degree of sharp reflecting edges, and shape can be varied as desired.

Although the present subject matter has been described in conjunction with triangular prismatic structured surfaces, it will be appreciated that the present subject matter includes the use of a wide array of other structured surfaces and forming channels and/or passages therein to vent or promote venting of volatiles during production of retroreflective sheets and articles.

Using the various methods and/or tooling as described herein, a wide array of retroreflective materials, articles, and/or products can be produced. Nonlimiting examples of such include signage, construction barriers, traffic barriers, and personal protection gear. It will be understood that the present subject matter includes other retroreflective materials, articles, and/or products.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A method for reducing occurrence of gases trapped between tooling and a polymeric sheet during manufacture of retroreflective materials, the method comprising:
   providing a substrate defining opposite peripheral edges and a molding surface extending between the edges, the molding surface including a plurality of prismatic structures, the plurality of prismatic structures defining an average structure height, the molding surface including a plurality of channels extending across at least a portion of the molding surface, the channels defining an average depth of from 5% to 50% of the average structure height;
   providing a polymeric sheet defining at least one face;
   embossing a pattern of the plurality of prismatic structures from the substrate to the face of the polymeric sheet;
   wherein during the embossing, gases disposed between the substrate and the polymeric sheet are urged through at least a portion of the channels, thereby reducing occurrence of trapped gases.

2. The method of claim 1 wherein the average depth of the channels is from 10% to 15% of the average structure height.

3. The method of claim 1 wherein the substrate is metal.

4. The method of claim 1 wherein the prismatic structures are triangles arranged so as to define a plurality of baselines separating each triangle from an adjacent triangle.

5. The method of claim 4 wherein the plurality of baselines include a first set of baselines oriented parallel to one another, a second set of baselines oriented parallel to one another and at 60 degrees from the first set of baselines, and a third set of baselines oriented parallel to one another and at 60 degrees from the second set of baselines and at 60 degrees from the first set of baselines.

6. The method of claim 5 wherein the plurality of channels include at least one channel extending along at least one of the first set of baselines, at least one channel extending along at least one of the second set of baselines, and at least one channel extending along at least one of the third set of baselines.

7. The method of claim 6 wherein the plurality of channels extending along at least one of the first set of baselines includes two channels separated by another of the first baselines.

8. The method of claim 7 wherein the plurality of channels extending along at least one of the second set of baselines includes two channels separated by another of the second baselines.

9. The method of claim 8 wherein the plurality of channels extending along at least one of the third set of baselines includes two channels separated by another of the third baselines.

10. A retroreflective material produced using the method of claim 1.

11. The retroreflective material of claim 10 selected from the group consisting of signage, construction barriers, traffic barriers, and personal protection gear.

12. Tooling for forming a pattern of microstructures, the tooling comprising:
   a substrate defining opposite peripheral edges and a molding surface extending between the edges, the molding surface including a plurality of prismatic structures, the plurality of prismatic structures defining an average structure height, the molding surface including a plurality of channels extending across at least a portion of the molding surface, the channels defining an average depth of from 5% to 50% of the average structure height.

13. The tooling of claim 12 wherein the plurality of channels provide access along at least one of the edges.

14. The tooling of claim 12 wherein the average depth of the channels is from 10% to 15% of the average structure height.

15. The tooling of claim 12 wherein the substrate is metal.

16. The tooling of claim 12 wherein the prismatic structures are triangles arranged so as to define a plurality of baselines separating each triangle from an adjacent triangle.

17. The tooling of claim 16 wherein the plurality of baselines include a first set of baselines oriented parallel to one another, a second set of baselines oriented parallel to one another and at 60 degrees from the first set of baselines, and a third set of baselines oriented parallel to one another and at 60 degrees from the second set of baselines.

18. The tooling of claim 17 wherein the plurality of channels include at least one channel extending along at least one of the first set of baselines, at least one channel extending along at least one of the second set of baselines, and at least one channel extending along at least one of the third set of baselines.

19. The tooling of claim 18 wherein the plurality of channels extending along at least one of the first set of baselines includes two channels separated by another of the first baselines.

20. The tooling of claim 19 wherein the plurality of channels extending along at least one of the second set of baselines includes two channels separated by another of the second baselines.

21. The tooling of claim 20 wherein the plurality of channels extending along at least one of the third set of baselines includes two channels separated by another of the third baselines.

22. A method for reducing occurrence of gases trapped between tooling and a polymeric sheet during manufacture of retroreflective materials, the method comprising:
providing a substrate defining opposite peripheral edges and a molding surface extending between the edges, the molding surface including a plurality of prismatic structures defined by baselines, the plurality of prismatic structures defining an average structure height, the molding surface including a plurality of passages, each passage located so as to extend across a baseline, the passages having an average depth of from 5% to 50% of the average structure height;
providing a polymeric sheet defining at least one face;
embossing a pattern of the plurality of prismatic structures from the substrate to the face of the polymeric sheet;
wherein during the embossing, gases disposed between the substrate and the polymeric sheet are urged through at least a portion of the passages, thereby reducing occurrence of trapped gases.

23. The method of claim 22 wherein each passage is located so as to extend perpendicular to a baseline.

24. The method of claim 22 wherein the average depth of the channels is from 10% to 15% of the average structure height.

25. The method of claim 22 wherein the substrate is metal.

26. The method of claim 22 wherein the prismatic structures are triangles arranged so as to define a plurality of baselines separating each triangle from an adjacent triangle.

27. A retroreflective material produced using the method of claim 22.

28. The retroreflective material of claim 27 selected from the group consisting of signage, construction barriers, traffic barriers, and personal protection gear.

29. Tooling for forming a pattern of microstructures, the tooling comprising:
a substrate defining opposite peripheral edges and a molding surface extending between the edges, the molding surface including a plurality of prismatic structures defined by baselines, the plurality of prismatic structures defining an average structure height, the molding surface including a plurality of passages, each passage located so as to extend across a baseline, the passages having an average depth of from 5% to 50% of the average structure height.

30. The tooling of claim 29 wherein each passage is located so as to extend perpendicular to a baseline.

31. The tooling of claim 29 wherein the average depth of the channels is from 10% to 15% of the average structure height.

32. The tooling of claim 29 wherein the substrate is metal.

33. The tooling of claim 29 wherein the prismatic structures are triangles arranged so as to define a plurality of baselines separating each triangle from an adjacent triangle.

34. A retroreflective material comprising a polymeric substrate including a plurality of prismatic structures, the plurality of prismatic structures defining a structured surface having a first set of structures with an average structure height, and a second set of structures having a height of from 5% to 50% of the height of the first set of structures, the prismatic structures including triangles arranged so as to define a plurality of baselines separating each triangle from an adjacent triangle.

35. The retroreflective material of claim 34 wherein the plurality of baselines include a first set of baselines oriented parallel to one another, a second set of baselines oriented parallel to one another and at 60 degrees from the first set of baselines, and a third set of baselines oriented parallel to one another and at 60 degrees from the second set of baselines and at 60 degrees from the first set of baselines.

36. The retroreflective material of claim 34 wherein the second set of structures have a height of from 10% to 15% of the height of the first set of structures.

37. The retroreflective material of claim 34 selected from the group consisting of signage, construction barriers, traffic barriers, and personal protection gear.

* * * * *